(12) United States Patent
Fontanella et al.

(10) Patent No.: US 6,330,172 B1
(45) Date of Patent: Dec. 11, 2001

(54) SWITCHING DEVICE

(75) Inventors: Luca Fontanella, Venezia; Giovanni Frattini, Travaco'; Giulio Ricotti, Broni, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/505,343

(22) Filed: Feb. 16, 2000

(30) Foreign Application Priority Data

Feb. 17, 1999 (IT) ............................................... MI99A0317

(51) Int. Cl.[7] .................................................. H02M 7/122
(52) U.S. Cl. ........................................ 363/56.02; 363/132
(58) Field of Search ................ 363/16, 17, 56.01–56.05, 363/58, 95, 98, 131, 132

(56) References Cited

U.S. PATENT DOCUMENTS 5,408,403 * 4/1995 Nerone et al. .......................... 363/37
5,712,536 * 1/1998 Haas et al. ............................ 315/247
5,805,433 * 9/1998 Wood ..................................... 363/16
5,903,446 * 5/1999 Huillet et al. .......................... 363/17
5,973,943 * 10/1999 Ribarich et al. ....................... 363/56

* cited by examiner

Primary Examiner—Matthew Nguyen
(74) Attorney, Agent, or Firm—E. Russell Tarleton; Seed IP Law Group PLLC

(57) ABSTRACT

A switching device having a first and a second electronic switch connected in a half-bridge configuration and each having a control terminal for receiving a switching signal alternatively having a turn-on value and a turn-off value for taking the first and second electronic switches to an on state and to an off state, respectively; the switching device includes, for each switch, means for detecting the state of the switch and means for keeping the switching signal at the turn-off value for one of the electronic switches when the detected state of the other electronic switch is the on state.

18 Claims, 2 Drawing Sheets

SWITCHING DEVICE

TECHNICAL FIELD

The present invention relates to a switching device and, more specifically, to a switching device with two switches in a half-bridge configuration and means for keeping one switch in an off state when the other is in an on state.

BACKGROUND OF THE INVENTION

Switching devices are commonly used in various applications, for example in power supply units, in oscillators, in inverters, in power amplifiers and similar. In a particular switching device, two electronic switches, typically two transistors, are connected in an half-bridge configuration. Each of the two transistors is alternatively switched-on and switched-off; when one transistor is on, the other transistor is off and vice versa.

A problem in half-bridge switching devices consists of a phenomenon known as cross-conduction. This is due to the fact that, in general, the turn-off time of the transistor which is on is higher than the turn-on time of the transistor which is off, so that at each switching of the two transistors there is an interval of time in which both transistors are on. This creates a short-circuit at the terminals of the half-bridge, which generates current peaks that can damage the transistors.

In order to prevent this problem, the transistors are typically controlled in a disoverlap manner, in particular, each transistor is switched on with a preset delay, called dead time, with respect to the instant in which the other transistor is switched off, so as to ensure that the two transistors are never both on at the same time.

A known solution for generating a signal with a duration equal to the dead time consists in employing a transient charging (or discharging) phenomenon in a circuit including a capacitor and a resistor, or an RC circuit, which time constant is proportional to the capacitance and the resistance of the capacitor and of the resistor, respectively. The RC circuit is typically integrated in a chip of semiconductor material wherein the switching device is also made; consequently, these parameters are difficult to control with accuracy and are subject to wide variations on the basis of temperature.

Consequently, the capacitor and the resistor need to be dimensioned so as to ensure that in any case the dead time is sufficiently long to prevent the two transistors from being on at the same time. This increases the duration of the interval of time in which the switching device is not active (with both transistors off) and does not allow the use of the device at high switching frequencies. Additional drawbacks of such structure consists in that the RC circuit is very cumbersome and occupies a considerable area on the semiconductor chip.

A different solution consists in using a digital circuit comprising a clock signal generator, made for example by means of a quartz oscillator, which is also used to switch the two transistors; this allows an extremely accurate dead time to be obtained. However, since the known clock signal generators operate with a frequency at most equal to several MHz and the duration of the on state and the off state of the transistors is generally higher by several orders of quantities than the duration of the dead time, such a solution can only be used at rather low switching frequencies, for example not higher than several tens of KHz.

SUMMARY OF THE INVENTION

The disclosed embodiments of the present invention overcome the above mentioned drawbacks with a switching device comprising a first and a second electronic switch connected in a half-bridge configuration and each having a control terminal for receiving a switching signal alternatively having a turn-on value and a turn-off value for taking the switch to an on state and to an off state, respectively; the switching device includes, for each switch, a circuit for detecting the state of the switch and a circuit for keeping the switching signal at the turn-off value when the detected state of the other switch is the on state.

Furthermore, a corresponding method for controlling a switching device is also proposed.

BRIEF DESCRIPTION OF THE DRAWINGS

Further features and the advantages of the switching device according to the present invention will be made clear by the following description of a preferred embodiment thereof, given purely by way of a non-restrictive indication, with reference to the attached figures, wherein.

DETAILED DESCRIPTION OF THE INVENTION

Figure 1:
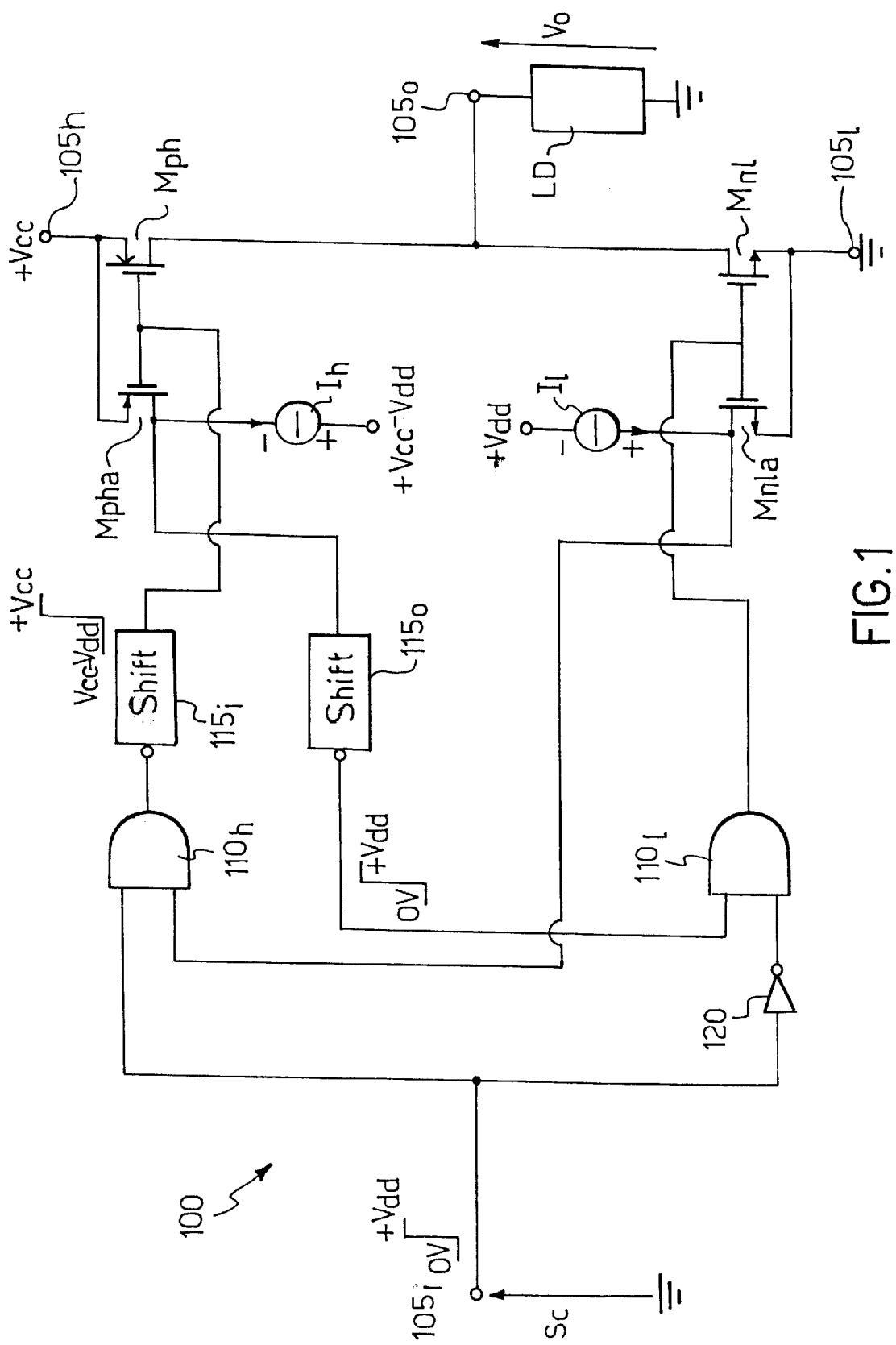
FIG. 1 schematically illustrates a circuit diagram of the switching device.

In particular, FIG. 1 illustrates a switching device 100 having two power supply terminals 105$l$ and 105$h$, an input terminal 105$i$ and an output terminal 105$o$. Terminal 105$l$ is connected to a reference terminal (or ground) and terminal 105$h$ is connected to the positive terminal of a power supply source +Vcc (with a value ranging from a few V to several hundreds of V), which negative terminal is connected to the ground terminal. A general control signal Sc is applied to the input terminal 105$i$ which alternatively assumes a logic value of 0, equal to the potential of the ground terminal (0V), and a logic value of 1, equal to the potential of a signal power supply source +Vdd (for example +5V). A load LD is connected between the output terminal 105$o$ and the ground terminal.

The switching device 100 includes a half-bridge formed by two MOS power transistors; in particular, a low-side N channel transistor Mnl and a high-side P channel transistor Mph are connected in complementary symmetry. The source terminal of transistor Mnl is connected to the power supply terminal 105$l$, while the source terminal of transistor Mph is connected to the power supply terminal 105$h$; the drain terminals of transistors Mnl and Mph are connected together to the output terminal 105$o$ An auxiliary N channel MOS signal transistor Mnla (or another equivalent means) is associated with the transistor Mnl, which source terminal and gate terminal are connected, respectively, to the source terminal and the gate terminal of transistor Mnl; the drain terminal of the auxiliary transistor Mnla is connected to the positive terminal (+) of a constant current generator Il, which negative terminal (−) is connected to the positive terminal of the signal power supply source +Vdd. The current generator Il prevents the formation of a short-circuit between the power supply terminal +Vdd and the ground terminal when the auxiliary transistor Mnla is on and is dimensioned (to provide, for example, a current of several tens of $\mu A$) so as to minimize power leaks in such a condition; alternatively, a current limiting resistor, or other equivalent biasing means, is provided.

Terminal 105$i$ and the drain terminal of the auxiliary transistor Mnla are connected to corresponding input terminals of an AND logic gate 110h. The output terminal of the AND logic gate 110h is connected to the input terminal of a voltage shift circuit (SHIFT) 115i, which output terminal is connected to the gate terminal of transistors Mph and Mpha. The circuit 115i inverts the input logic signal and shifts the corresponding voltage, variable from 0V to +Vdd, to a value included in the range from +Vcc–Vdd and +Vcc so as to ensure that the voltage between the gate terminal and the source terminal of the transistors Mph and Mpha in any case assumes a correct value (this circuit consists of a simple NOT logic gate in the case in which the value of the power supply voltage +Vcc is essentially equal to +Vdd).

In a dual manner, a P channel MOS signal auxiliary transistor Mpha is associated to transistor Mph, which source terminal and gate terminal are connected, respectively, to the source terminal and the gate terminal of transistor Mph; the drain terminal of auxiliary transistor Mpha is connected to the negative terminal (−) of a constant current generator Ih which positive terminal (+) is connected to a power supply terminal of +Vcc-Vdd. The drain terminal of auxiliary transistor Mpha is connected to the input terminal of a voltage shift circuit (SHIFT) 115o; the circuit 115o shifts the input voltage, variable from +Vcc–Vdd and +Vcc, to a value included in the range from 0V to +Vdd and then inverts the corresponding logic signal. Terminal 105i is connected to the input terminal of a NOT logic gate 120. The output terminal of the NOT gate 120 and the output terminal of the shift circuit 115o are connected to corresponding input terminals of an AND logic gate 110l, which output terminal is connected to the gate terminal of transistors Mnl, Mnla.

The control signal Sc is applied directly to an input terminal of the AND gate 110h, so that when this signal has a logic value of 0 (0V), the logic signal at its output terminal is equal to 0, regardless of the logic signal of the other input terminal. The corresponding voltage 0V, inverted and shifted by circuit 115i to a value of +Vcc, is applied to the gate terminal of transistors Mph and Mpha which consequently are both off. The voltage at the drain terminal of the auxiliary transistor Mpha is consequently equal to +Vcc–Vdd and is shifted and inverted by circuit 115o to a value of +Vdd; the corresponding logic signal 1 is applied to an input terminal of the AND gate 110l so that the logic signal 1 (control signal Sc negated by the NOT gate 120) applied to the other input terminal is sent to its output terminal. The corresponding voltage +Vdd is applied to the gate terminal of transistors Mnl and Mnla which are consequently both on.

In a dual manner, when the control signal Sc has a logic value of 1 (+Vdd), such a signal negated to the logic value of 0 by the NOT gate 120 is sent to the output terminal of the AND gate 110l and the corresponding voltage 0V is applied to the gate terminal of transistors Mnl and Mnla which are consequently both off. The voltage at the drain terminal of the auxiliary transistor Mnla is consequently equal to +Vdd; the corresponding logic signal 1 is applied to an input terminal of the AND gate 110h, so that the logic signal 1 (control signal Sc) applied to the other input terminal is sent to its output terminal. The corresponding voltage +Vdd, inverted and shifted by circuit 115i to a value of +Vcc–Vdd, is applied to the gate terminal of transistors Mph and Mpha which are consequently both on.

As a consequence, when the control signal Sc has a logic value of 0, the transistor Mnl is on and the transistor Mph is off, and the voltage at the terminals of the load LD (hereafter referred to as Vo) is equal to 0V; conversely, when the control signal Sc has a logic value of 1, the transistor Mnl is off and the transistor Mph is on, and the voltage Vo is equal to +Vcc. In this way, a rectangular wave form voltage is applied to the load LD with an average value which can be adjusted by operating on the ratio between the on time and the off time of the transistors Mnl, Mph.

Similar considerations apply in the case in which two bipolar transistors, or other equivalent electronic switches, are connected together in a half-bridge configuration with each having a control terminal for receiving a switching signal alternatively having a turn-on value (+Vdd for transistor Mnl and +Vcc–Vdd for transistor Mph) and a turn-off value (0V for transistor Mnl and +Vcc for transistor Mph) for taking the switch to an on state and to an off state, respectively.

Now, consider switching the control signal Sc from the logic value 0 (transistors Mnl, Mnla on and transistors Mph, Mpha off) to the logic value 1. Such a logic signal is negated by the NOT gate 120 and sent to the output terminal of the AND gate 110l; consequently, the corresponding voltage 0V is immediately applied to the gate terminal of transistors Mnl and Mnla, which are consequently both switched-off after their turn-off time. During this turn-off time, in which transistors Mnl, Mnla are still on, the voltage at the drain terminal of the auxiliary transistor Mnla is equal to 0V; the corresponding logic signal 0 is applied to an input terminal of the AND gate 110h and consequently the logic signal at its output terminal is kept equal to 0; this inhibits the sending of the logic signal 1 (control signal Sc) applied to the other input terminal and consequently transistors Mph and Mpha are kept off. At the end of the turn-off time of transistors Mnl and Mnla, the voltage at the drain terminal of the auxiliary transistor Mnla reaches the value of +Vdd (since the auxiliary transistor Mnla is off); the corresponding logic signal 1 applied to an input terminal of the AND gate 110h thus enables the sending of the logic signal 1 (control signal Sc) applied to the other input terminal so as to switch-on transistors Mph and Mpha (after their turn-on time).

In a dual manner, if the control signal Sc is switched from a logic value of 1 (transistors Mph, Mpha on and transistors Mnl, Mnla off) to a logic value of 0, such a logic signal is sent to the output terminal of the AND gate 110h and then negated and shifted by the circuit 115i to the value of +Vcc; this voltage is immediately applied to the gate terminal of transistors Mph and Mpha, which are consequently both turned-off after their turn-off time. During such tar-off time, the voltage at the drain terminal of the auxiliary transistor Mpha (still on) is equal to +Vcc and is shifted and inverted by the circuit 115o to the value of 0V; the corresponding logic signal 0 is applied to an input terminal of the AND gate 110l and then the logic signal at its output terminal is kept equal to 0 so as to keep transistors Mnl and Mnla off. At the end of the turnoff time of transistors Mph and Mpha, the voltage at the drain terminal of the auxiliary transistor Mpha (off) reaches a value of +Vcc–Vdd and is shifted and inverted by the circuit 115o to the value of +Vdd; the corresponding logic signal 1 applied to an input terminal of the AND gate 110l, now enables sending the logic signal 1 (control signal Sc negated by the NOT gate 120) applied to the other input terminal so as to switch-on transistors Mnl and Mnla (after their turn-on time).

Similar considerations apply in the case in which the NOT gate 120 is connected to the AND gate 110h instead of the AND gate 110l, or equivalent logic means are used to inhibit or enable the sending of the control signal Sc (for transistor Mph) or of the negated control signal Sc (for transistor Mnl) according to the state of the other transistor, or more generally other equivalent means for detecting the state (on or off) of each transistor Mnl and Mph and for keeping the switching signal applied to the other transistor at the turn-off value (+Vcc for transistor Mph and 0V for transistor Mnl) when the on state is detected are provided.

The solution according to the disclosed embodiments of the present invention automatically adapts to the characteristics of the switching device, ensuring in all conditions that the two transistors of the half-bridge are never on at the same time. This result is obtained by keeping the switching device inactive only for the strictly required time.

The structure of this invention is extremely simple and reliable; it can be used in a wide range of operating frequencies of the switching device. Furthermore, such structure can be easily adapted to a wide variety of requirements in terms of precision and accuracy.

The particular circuit structure described above offers the additional advantage of an extremely limited power loss (since it employs signal components only); furthermore, it is made using a reduced number of simple logic gates for which reason it occupies a very limited space of the semiconductor chip where the switching device is typically made.

Figure 2:
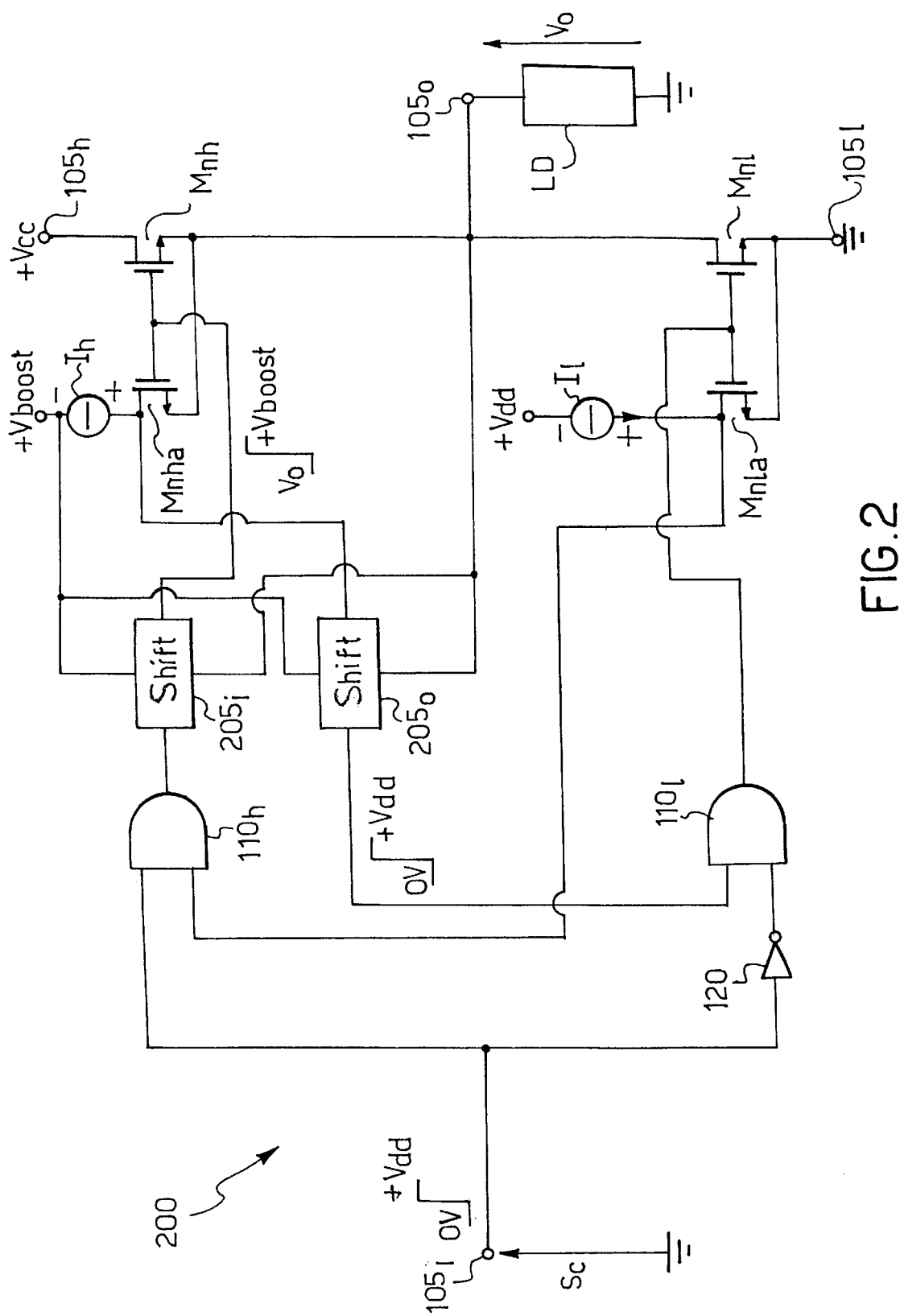
FIG. 2 illustrates a different embodiment of the switching device.

In a different embodiment of this invention illustrated in FIG. 2 (the elements corresponding to those shown in FIG. 1 are referred to with the same numbers and symbols; explanations thereof have been omitted for the sake of simplicity), a switching device 200, including a non complementary half-bridge formed by two N channel MOS power transistors Mnl and Mnh, is provided. In particular, the source terminal of the transistor Mnl is connected to the power supply terminal 105*l*, while the drain terminal of transistor Mnh is connected to the power supply terminal 105*h*; the drain terminal of transistor Mnl and the source terminal of transistor Mnh are connected together to the output terminal 105*o*. Similar considerations apply in the case in which two P channel MOS transistors, two bipolar transistors, or similar are used.

As in the previous case, an N channel MOS signal auxiliary transistor, referred to as Mnla and Mnha, respectively, is associated to the transistors Mnl and Mnh. A voltage shift circuit (SHIFT) 205*i* is arranged between the output terminal of the AND gate 110*h* and the gate terminal of transistors Mnh, Mnha; such a circuit has two power supply terminals respectively connected to the output terminal 105*o* and to a bootstrap power supply terminal +Vboost having a value equal to Vo+Vdd, with Vo variable in time from a value of 0V (transistor Mnl on and transistor Mnh off) to a value of +Vcc (transistor Mnh on and transistor Mnl off). The circuit 205*i* shifts the input voltage, variable from 0V to +Vdd, to a value included in the range from Vo and +Vboost=Vo+Vdd.

In this case, the drain terminal of the auxiliary transistor Mnha is connected to the positive terminal (+) of the constant current generator Ih, which negative terminal (−) is connected to the power supply terminal +Vboost. An additional voltage shift circuit (SHIFT) 205*o* is connected between the drain terminal of the auxiliary transistor Mnha and an input terminal of the AND gate 110*l*; the circuit 205*o* shifts the input voltage, variable from Vo to Vo+Vdd (with Vo variable in time from 0V to +Vcc) to a value in the range from 0V to +Vdd.

The operation of the switching device 200 is similar to that of the circuit illustrated in FIG. 1, so that when the control signal Sc has a logic value of 0, the transistor Mnh is off (voltage at the gate terminal equal to Vo=0V) and the transistor Mnl is on (voltage at the gate terminal equal to +Vdd), and when the control signal Sc has a logic value of 1, the transistor Mnh is on (voltage at the gate terminal equal to Vo+Vdd=+Vcc+Vdd) and transistor Mnl is off (voltage at the gate terminal equal to 0V).

If the control signal Sc is switched from the logic value of 0 (transistors Mnl, Mnla on and transistors Mnh, Mnha off) to the logic value of 1, the voltage at the gate terminal of the transistors Mnh, Mnha is kept at a value of Vo=0V for the entire turn-off time of the transistors Mnl, Mnla, and, in a dual manner, if the control signal Sc is switched from the logic value of 1 (transistors Mnh, Mnha on and transistors Mnl, Mnla off) to a logic value of 0, the voltage at the gate terminal of the transistors Mnl, Mnla is kept at a value of 0V for the entire turnoff time of the transistors Mnh, Mnha. This ensures that in any condition the two transistors on the half-bridge are never on at the same time.

Naturally, in order to satisfy local and specific requirements, a person skilled in the art may apply to the switching device described above many modifications and alterations all of which, however, are included within the scope of protection of the invention as defined by the following claims.

What is claimed is:

1. A switching device, comprising: a first and a second transistor connected in a half-bridge configuration, and each of the first and second transistors having a first and a second operating terminal and a control terminal for receiving a switching signal alternatively having a turn-on value and a turn-off value for taking each of the first and second transistors to an on state and to an off state, respectively;

means for each transistor for detecting the state of the transistor and means for keeping the switching signal at the turn-off value when the state of the other transistor is the on state, the detecting means for detecting the state of the first and second transistors configured to output a state signal having a first and a second logic value corresponding to the on state and to the off state of the first and second transistors, respectively, and including a first and a second auxiliary transistor, respectively, each having a control terminal, a first operating terminal and a second operating terminal, the first and second transistor and each associated auxiliary transistor having the control terminal and the first operating terminal in common for receiving the switching signal.

2. The switching device of claim 1 wherein the first transistor and the first auxiliary transistor have a first polarity and the second transistor and the second auxiliary transistor have a second polarity opposed to the first polarity, each transistor having the first terminal connectable to a corresponding power supply source, and the first and the second transistor having the second terminal in common for connecting a load.

3. The switching device of claim 1 wherein the first transistor, the first auxiliary transistor, the second transistor, and the second auxiliary transistor have the same polarity, the first transistor having the first terminal and the second transistor having the second terminal connectable to a corresponding power supply source, and the second terminal of the first transistor and the first terminal of the second transistor being in common for connecting a load.

4. The switching device of claim 1 wherein the first transistor and the second transistor are power transistors and the first auxiliary transistor and the second auxiliary transistor are signal transistors, and wherein the second terminal of the first auxiliary transistor is connected to first biasing means and the second terminal of the second auxiliary transistor is connected to second biasing means and to a voltage shift circuit, the state signal consisting of a voltage to the second terminal of the first auxiliary transistor and of a voltage to the shift circuit output terminal, respectively.

5. The switching device of claim 1 wherein the switching device comprises an input terminal for receiving a general control signal alternatively having the first and the second logic value, and in which the switching signal keeping means associated with the first switch and with the second switch include logic means for receiving a first input signal being the negated control signal and the control signal, respectively, and a second input signal being the signal output by the detecting means associated with the other switch, and for outputting a signal having the second logic value when the first and the second input signals both have the second logic value and the first logic value otherwise, the switching signal having the turn-off value and the turn-on value when the output signal has the first and the second logic value, respectively.

6. The switching device of claim 5, wherein the first and the second logic values are 0 and 1, respectively, the logic means associated with the first switch and with the second switch including a first and a second AND logic gate, respectively.

7. The switching device of claim 6, wherein the first AND gate is directly connected to the control terminal of the first switch and the second AND gate is connected via an additional voltage shift circuit to the control terminal of the second switch for applying the corresponding switching signal.

8. A half-bridge switching circuit, comprising:
a first transistor and a second transistor coupled in series between a voltage source and a reference voltage; and
a control circuit coupled to the first and second transistors and configured to detect the conduction state of the first and second transistors and to maintain one of the first and second transistors in a non-conducting state while the other of the first and second transistors is in a conducting state, the control circuit comprising a first auxiliary transistor coupled to the first transistor and to a first current source; and a second auxiliary transistor coupled to the second transistor and to a second current source, the first and second auxiliary transistors configured to receive a switching signal and control the first and second transistors in response to the switching signal.

9. The circuit of claim 8 wherein the control circuit further comprises a first AND gate having a first input coupled to a switching signal source, a second input coupled to the second auxiliary transistor, and an output coupled to the first auxiliary transistor; and a second AND gate having a first input coupled to the first auxiliary transistor, a second input coupled to the switching signal source, and an output coupled to the second auxiliary transistor.

10. The circuit of claim 9, further comprising a first voltage shifter coupled in series between the output of the first AND gate and the first auxiliary transistor; and a second voltage shifter coupled in series between the first input of the second AND gate and the first auxiliary transistor.

11. The circuit of claim 8 wherein the first auxiliary transistor has a control terminal connected to a control terminal of the first transistor at a first node, and wherein the second auxiliary transistor has a control terminal connected to a control terminal of the second transistor at a second node.

12. The circuit of claim 11 wherein the control circuit further comprises a first AND gate having a first input coupled to a switching signal source, a second input coupled to a drain of the second auxiliary transistor, and an output coupled to the first node between the first transistor and the first auxiliary transistor; and a second AND gate having a first input coupled to the drain of the first auxiliary transistor, a second input coupled to the switching signal source through an inverter, and an output coupled to the second node between the second transistor and the second auxiliary transistor.

13. The circuit of claim 12, further comprising a first voltage shifter coupled in series between the output of the first AND gate and the first node between the first transistor and the first auxiliary transistor; and a second voltage shifter coupled in series between the first input of the second AND gate and the drain of the first auxiliary transistor.

14. The circuit of claim 11 wherein the first and second transistors and the first and second auxiliary transistors are of the same polarity.

15. The circuit of claim 14 wherein the first voltage shifter is further coupled to a second voltage source and to an output terminal; and wherein the second voltage shifter is further coupled to the second voltage source and to the output terminal.

16. A switching device, comprising:
a first and a second transistor connected in a half-bridge configuration, each of the first and second transistors having a control terminal for receiving a switching signal alternatively having a turn-on value and a turn-off value for taking each of the first and second transistors to an on state and to an off state, respectively;
detecting means for detecting the state of the first and second transistors and means for keeping the switching signal at the tun-off value when the state of the other transistor is in the on state, the detecting means configured to output a state signal having a first and a second logic value corresponding to the on state and to the off state of the first and second transistors, respectively; and
an input terminal for receiving a general control signal alternatively having the first and the second logic value, and in which the switching signal keeping means associated with the first switch and with the second switch include logic means for receiving a first input signal that is the negated control signal and the control signal, respectively, and a second input signal that is the signal output by the detecting means associated with the other switch, and for outputting a signal having the second logic value when the first and the second input signals both have the second logic value and the first logic value otherwise, the switching signal having the turn-off value and the turn-on value when the output signal has the first and the second logic value, respectively.

17. The switching device of claim 16 wherein the first and the second logic values are 0 and 1, respectively, the logic means associated with the first switch and with the second switch including a first and a second AND logic gate, respectively.

18. The switching device of claim 17, wherein the first AND gate is directly connected to the control terminal of the first switch and the second AND gate is connected via an additional voltage shift to the control terminal of the second switch for applying the corresponding switching signal.

* * * * *

UNITED STATES PATENT AND TRADEMARK OFFICE
CERTIFICATE OF CORRECTION

PATENT NO. : 6,330,172 B1
DATED : December 11, 2001
INVENTOR(S) : Fontanella et al.

It is certified that error appears in the above-identified patent and that said Letters Patent is hereby corrected as shown below:

Column 8,
Line 33, "at the *tun*-off value" should read as -- at the *turn*-off value --.
Lines 42 and 43, "the first switch and with the second switch" should read as
-- the first transistor and with the second transistor --.
Line 47, "the other switch," should read as -- the other transistor, --.

Signed and Sealed this

Twenty-first Day of June, 2005

JON W. DUDAS
*Director of the United States Patent and Trademark Office*